United States Patent
Deering et al.

(10) Patent No.: US 7,106,326 B2
(45) Date of Patent: Sep. 12, 2006

(54) SYSTEM AND METHOD FOR COMPUTING FILTERED SHADOW ESTIMATES USING REDUCED BANDWIDTH

(75) Inventors: Michael F. Deering, Los Altos, CA (US); Michael G. Lavelle, Saratoga, CA (US); Douglas C. Twilleager, Oakland, CA (US); Daniel S. Rice, Oakland, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 350 days.

(21) Appl. No.: 10/378,279

(22) Filed: Mar. 3, 2003

(65) Prior Publication Data

US 2004/0174360 A1 Sep. 9, 2004

(51) Int. Cl.
*G06T 15/50* (2006.01)
*G06T 15/60* (2006.01)

(52) U.S. Cl. ..................................... 345/426
(58) Field of Classification Search ................ 345/426
See application file for complete search history.

(56) References Cited

U.S. PATENT DOCUMENTS

| | | | | |
|---|---|---|---|---|
| 4,866,637 A | * | 9/1989 | Gonzalez-Lopez et al. . | 345/426 |
| 4,901,064 A | * | 2/1990 | Deering ...................... | 345/426 |
| 4,965,844 A | * | 10/1990 | Oka et al. .................... | 345/581 |
| 5,299,298 A | * | 3/1994 | Elmquist et al. ............. | 345/421 |
| 5,487,172 A | * | 1/1996 | Hyatt .......................... | 712/32 |
| 5,625,768 A | * | 4/1997 | Dye ............................ | 345/441 |
| 5,664,162 A | * | 9/1997 | Dye ............................ | 345/532 |
| 5,675,773 A | * | 10/1997 | Devic ......................... | 345/522 |
| 5,684,941 A | * | 11/1997 | Dye ............................ | 345/441 |
| 5,706,478 A | * | 1/1998 | Dye ............................ | 345/503 |
| 5,742,749 A | * | 4/1998 | Foran et al. ................. | 345/426 |
| 5,778,250 A | * | 7/1998 | Dye ............................ | 712/32 |

(Continued)

OTHER PUBLICATIONS

Isard et al., "Distributed rendering of interactive soft shadows", Proc. of Fourth Eurographics Workshop on Parallel Graphics and Visualization, Sep. 2002, ACM International Conference Proceeding Series, vol. 29, pp. 71-76.*

(Continued)

*Primary Examiner*—Ulka Chauhan
*Assistant Examiner*—Roberta Prendergast
(74) *Attorney, Agent, or Firm*—Meyertons Hood Kivlin Kowert & Boetzel, P.C.; Jeffrey C. Hood; Mark K. Brightwell

(57) ABSTRACT

A graphical processing system comprising a computational unit and a shadow processing unit coupled to the computational unit through a communication bus. The computational unit is configured to transfer coordinates $C_1$ of a point P with respect to a first space to the shadow processing unit. In response to receiving the coordinates $C_1$, the shadow processing unit is configured to: (a) transform the coordinate $C_1$ to determine map coordinates s and t and a depth value $D_P$ for the point P, (b) access a neighborhood of depth values from a memory using the map coordinates s and t, (c) compare the depth value $D_P$ to the depth values of the neighborhood, (d) filter binary results of the comparisons to determine a shadow fraction, and (e) transfer the shadow fraction to the computational unit through the communication bus.

20 Claims, 17 Drawing Sheets

U.S. PATENT DOCUMENTS

| | | | |
|---|---|---|---|
| 5,951,672 A * | 9/1999 | Kwok et al. | 712/28 |
| 6,016,150 A * | 1/2000 | Lengyel et al. | 345/426 |
| 6,046,752 A * | 4/2000 | Kirkland et al. | 345/505 |
| 6,088,044 A * | 7/2000 | Kwok et al. | 345/505 |
| 6,195,106 B1 * | 2/2001 | Deering et al. | 345/545 |
| 6,412,061 B1 * | 6/2002 | Dye | 712/32 |
| 6,437,782 B1 | 8/2002 | Pieragostini et al. | |
| 6,459,429 B1 * | 10/2002 | Deering | 345/423 |
| 6,567,083 B1 | 5/2003 | Baum et al. | |
| 6,647,439 B1 * | 11/2003 | Nouvet et al. | 710/27 |
| 6,664,962 B1 * | 12/2003 | Komsthoeft et al. | 345/426 |
| 6,674,430 B1 * | 1/2004 | Kaufman et al. | 345/419 |
| 6,791,544 B1 * | 9/2004 | Hong et al. | 345/426 |
| 2003/0076320 A1 * | 4/2003 | Collodi | 345/426 |

OTHER PUBLICATIONS

Deering et al. "The SAGE graphics architecture", Proc. of 29th Annual Conference on Computer Graphics and interactive Techniques, SIGGRAPH '02. ACM Press, New York, NY, pp. 683-692.*

Steve Upstill, "Renderman Companion—A Programmer's Guide to Realistic Graphics," 1990, (pp. 268-271, 324 & 378-380).

Lance Williams, "Casting Curved Shadows on Curved Surfaces," Computer Graphics Lab, (pp. 270-274).

Reeves et al., "Rendering Antialiased Shadows with Depth Maps," Computer Graphics, vol. 21, No. 4, Jul. 1987, (pp. 283-291).

* cited by examiner

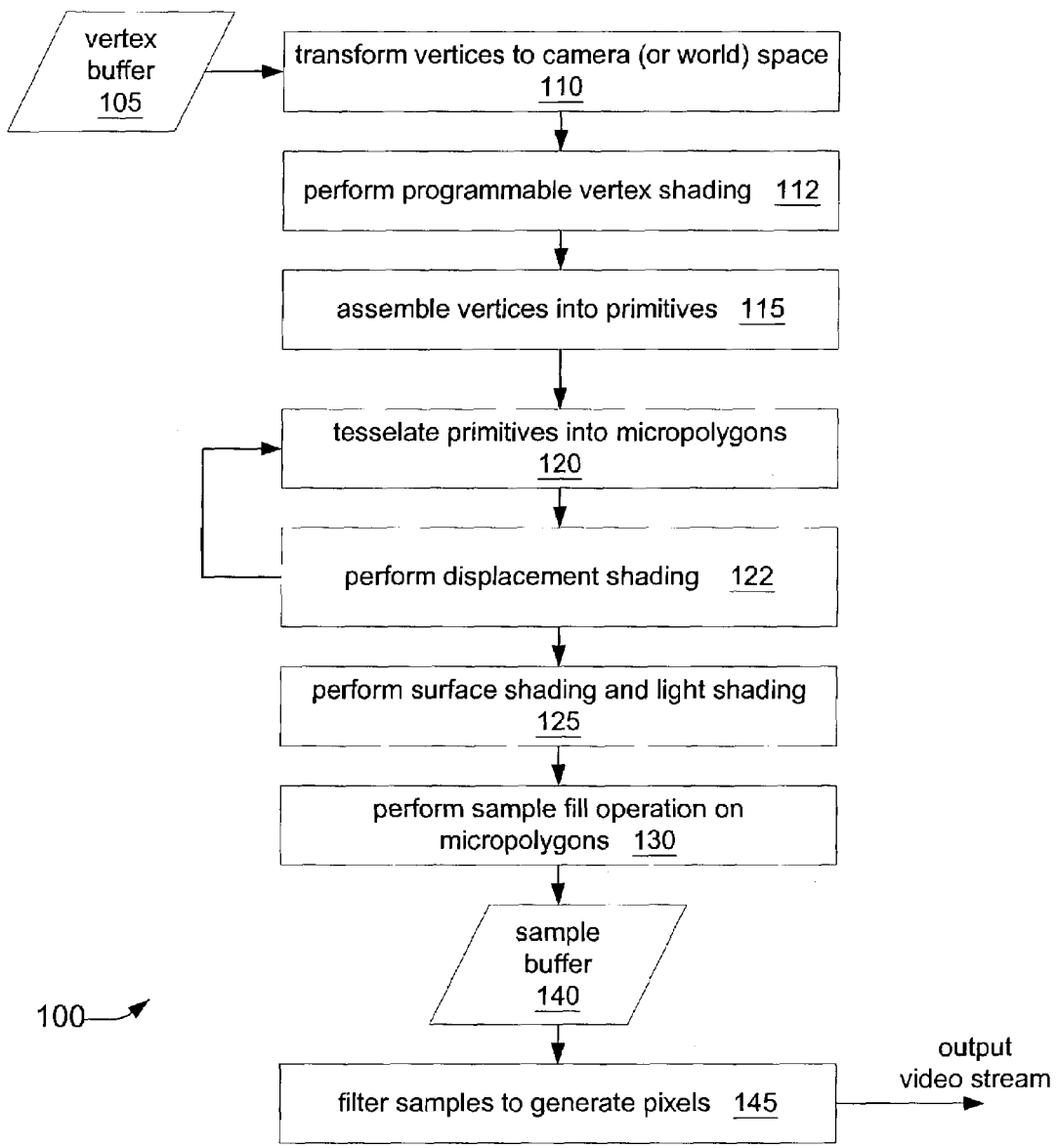
Fig. 1: Rendering Pipeline

SYSTEM AND METHOD FOR COMPUTING FILTERED SHADOW ESTIMATES USING REDUCED BANDWIDTH

BACKGROUND OF THE INVENTION

1. Field of the Invention

This invention relates generally to the field of computer graphics and, more particularly, to a system and method for rendering scenes including the effects of shadowing with respect to one or more light sources.

2. Description of the Related Art

Shadow mapping is a technique for generating shadows on three-dimensional graphics hardware. It involves computing a first image (i.e., the shadow depth image) from the point of view of a light source that is to cast shadows. Each pixel in the first image indicates a distance between the light source and an object visible along a ray emanating from the light source. The scene is then re-rendered from the viewer's location to generate a second image (i.e., the rendered image) as follows. At each visible point P of an object its distance $D_P$ to the light source is computed. If the distance between the object point and the light source is less than or equal to the distance of the closest object to the light source along the same directional ray, the object point is illuminated. If not, the object point is in shadow. Standard matrix transformations may be used to compute the required distances and to identify the point in the shadow depth image that corresponds with a screen pixel in the rendered image. This technique is prone to jagged shadow edges, since each pixel is determined to be entirely in or out of shadow.

In order to smooth the shadow edges, a neighborhood of several pixels is examined in the shadow depth image, and the distance of each pixel in the neighborhood is compared to the object-light distance $D_P$. The proportion of nearby shadow pixels that are smaller than the object-light distance $D_P$ is used to determine the degree of shadow. This is known in the literature as "percentage closer" filtering. Rather than simply counting how many pixels are closer, which may lead to stairstep artifacts, it is conventional to apply a set of weights to each shadow pixel in the neighborhood, so that more central shadow pixels are given greater influence in the result.

Because filtered shadow mapping improves the appearance of rendered shadows, it would be very desirable to provide support for this feature in graphics rendering hardware, especially in real-time graphics rendering hardware.

SUMMARY

In one set of embodiments, a graphical processing system may be configured with a computational unit coupled to a processing unit through a communication bus. The computational unit may be configured to transfer coordinates $C_1$ of a point P with respect to a first space (e.g., virtual world space or screen space) to the processing unit. In response to receiving the coordinates $C_1$, the processing unit may be configured to (a) transform the coordinates $C_1$ to determine map coordinates s and t and a depth value $D_p$ for the point P, (b) access a neighborhood of depth values from a memory using the map coordinates s and t, (c) compare the depth value $D_P$ to the depth values of the neighborhood, (d) filter binary results of the comparisons to determine a fraction which indicates the darkness (or intensity) of a shadow cast by a light source, and (e) transfer the shadow fraction to the computational unit through the communication bus. The computational unit may be configured to modify a color (or a set of colors) associated with the point P using the shadow fraction.

The computational unit may be implemented on a first integrated circuit, and the processing unit may be implemented on a second integrated circuit. The memory may be embedded on the second integrated circuit. Alternatively, the memory may be implemented in one or more separate integrated circuits. The processing unit may be coupled to the memory through a fast access connection.

In some embodiments, a method for performing graphical rendering may include: (1) performing a first rendering pass from the perspective of a first light source; (2) storing a depth buffer image generated in the first rendering pass in a memory; and (3) performing a second rendering pass from the perspective of a user viewpoint. The second rendering pass may include: transferring a position of a first point on a first object to a processing unit; the processing unit performing a texture transform on the position to determine map coordinates s and t and a depth value $D_P$ for the first point; the processing unit comparing a subset of depth values in the memory to the depth value $D_P$, where the subset of depth values is determined by the map coordinates s and t; the processing unit computing a shadow fraction by filtering binary results of said comparing; and the processing unit outputting the shadow fraction.

BRIEF DESCRIPTION OF THE DRAWINGS

A better understanding of the present invention can be obtained when the following detailed description is considered in conjunction with the following drawings, in which:

FIG. 1 illustrates one set of embodiments of a graphics rendering pipeline;

Figure 2A:
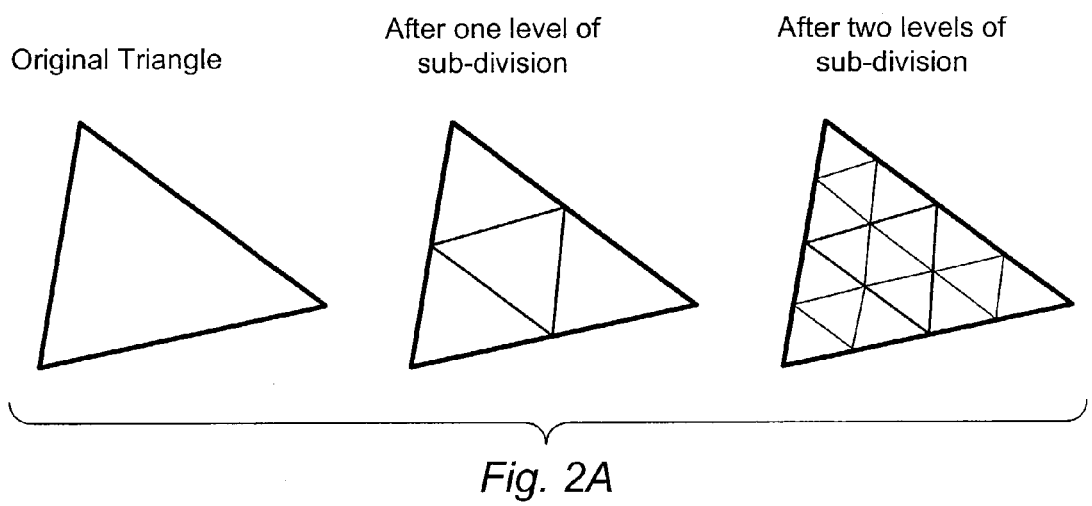
FIG. 2A illustrates one embodiment of a triangle fragmentation process.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE
PREFERRED EMBODIMENTS

Various Spaces

Model Space: The space in which an object (or set of objects) is defined.

Virtual World Space: The space in which a scene comprising a collection of objects and light sources may be constructed. Each object may be injected into virtual world space with a transformation that achieves any desired combination of rotation, translation and scaling of the object. In older terminology, virtual world space has often been referred to simply as "world space".

Camera Space: A space defined by a transformation $T^{VC}$ from virtual world space. The transformation $T^{VC}$ may achieve a combination of translation, rotation, and scaling. The translation and rotation account for the current position and orientation of a virtual camera in the virtual world space. The coordinate axes of camera space are rigidly bound to the virtual camera. In OpenGL, camera space is referred to as "eye space".

Clipping Space: A space defined by a transform $T^{CX}$ from camera space before any perspective division by the W coordinate, and is used as an optimization in some clipping algorithms. In clipping space, the sides of the perspective-projection view volume may occur on the bounding planes X=±W, Y=±W, Z=0 and Z=−W. Clipping space is not mandated by the abstract rendering pipeline disclosed herein, and is defined here as a convenience for hardware implementations that choose to employ it.

Image Plate Space: A two-dimensional space with a normalized extent from −1 to 1 in each dimension, created after perspective division by the W coordinate of clipping space, but before any scaling and offsetting to convert coordinates into render pixel space).

Pixel Plate Space: A two-dimensional space created after perspective division by the W coordinate of camera space, but before any scaling and offsetting to convert coordinates into render pixel space.

Render Pixel Space: A space defined by a transform $T^{IR}$ from image plate space (or a transform $T^{JR}$ from pixel plate space). The transform $T^{IR}$ (or $T^{JR}$) scales and offsets points from image plate space (or pixel plate space) to the native space of the rendered samples. See FIGS. 7 and 8.

Video Pixel Space: According to the abstract rendering pipeline defined herein, a filtering engine generates virtual pixel positions in render pixel space (e.g., as suggested by the plus markers of FIG. 8), and may compute a video pixel at each of the virtual pixel positions by filtering samples in the neighborhood of the virtual pixel position. The horizontal displacement Δx and vertical displacement Δy between virtual pixel positions are dynamically programmable values. Thus, the array of virtual pixel positions is independent of the array of render pixels. The term "video pixel space" is used herein to refer to the space of the video pixels.

Texture Vertex Space: The space of the texture coordinates attached to vertices. Texture vertex space is related to texture image space by the currently active texture transform. (Effectively, every individual geometry object defines its own transform from texture vertex space to model space, by the association of the position, texture coordinates, and possibly texture coordinate derivatives with all the vertices that define the individual geometry object.)

Texture Image Space: This is a space defined by the currently active texture transform. It is the native space of texture map images.

Light Source Space: A space defined by a given light source.

Abstract Rendering Pipeline

FIG. 1 illustrates a rendering pipeline 100 that supports per-pixel programmable shading. The rendering pipeline 100 defines an abstract computational model for the generation of video pixels from primitives. Thus, a wide variety of hardware implementations of the rendering pipeline 100 are contemplated.

Vertex data packets may be accessed from a vertex buffer 105. A vertex data packet may include a position, a normal vector, texture coordinates, texture coordinate derivatives, and a color vector. More generally, the structure of a vertex data packet is user programmable. As used herein the term vector denotes an ordered collection of numbers.

In step 110, vertex positions and vertex normals may be transformed from model space to camera space or virtual world space. For example, the transformation from model space to camera space may be represented by the following expressions:

$$X^C = T^{MC} X^M,$$

$$N^C = G^{MC} n^M.$$

If the normal transformation $G^{MC}$ is not length-preserving, the initial camera space vector $N^C$ may be normalized to unit length:

$$n^C = N^C / \text{length}(N^C).$$

For reasons that will become clear shortly, it is useful to maintain both camera space (or virtual world space) position and render pixel space position for vertices at least until after tessellation step 120 is complete. (This maintenance of vertex position data with respect to two different spaces is referred to herein as "dual bookkeeping".) Thus, the camera space position $X^C$ may be further transformed to render pixel space:

$$X^R = T^{CR} X^C.$$

The camera-space-to-render-pixel-space transformation $T^{CR}$ may be a composite transformation including transformations from camera space to clipping space, from clipping space to image plate space (or pixel plate space), and from image plate space (or pixel plate space) to render pixel space.

In step 112, one or more programmable vertex shaders may operate on the camera space (or virtual world space) vertices. The processing algorithm performed by each vertex shader may be programmed by a user. For example, a vertex shader may be programmed to perform a desired spatial transformation on the vertices of a set of objects.

In step 115, vertices may be assembled into primitives (e.g. polygons or curved surfaces) based on connectivity information associated with the vertices. Alternatively, vertices may be assembled into primitives prior to the transformation step 110 or programmable shading step 112.

In step 120, primitives may be tessellated into micropolygons. In one set of embodiments, a polygon may be declared to be a micropolygon if the projection of the polygon in render pixel space satisfies a maximum size constraint. The nature of the maximum size constraint may vary among hardware implementations. For example, in some implementations, a polygon qualifies as a micropolygon when each edge of the polygon's projection in render pixel space has length less than or equal to a length limit $L_{max}$ in render pixel space. The length limit $L_{max}$ may equal one or one-half. More generally, the length limit $L_{max}$ may equal a user-programmable value, e.g., a value in the range [0.5,2.0].

As used herein the term "tessellate" is meant to be a broad descriptive term for any process (or set of processes) that operates on a geometric primitive to generate micropolygons.

Tessellation may include a triangle fragmentation process that divides a triangle into four subtriangles by injecting three new vertices, i.e, one new vertex at the midpoint of each edge of the triangle as suggested by FIG. 2A. The triangle fragmentation process may be applied recursively to each of the subtriangles. Other triangle fragmentation processes are contemplated. For example, a triangle may be subdivided into six subtriangles by means of three bisecting segments extending from each vertex of the triangle to the midpoint of the opposite edge.

Figure 2B:
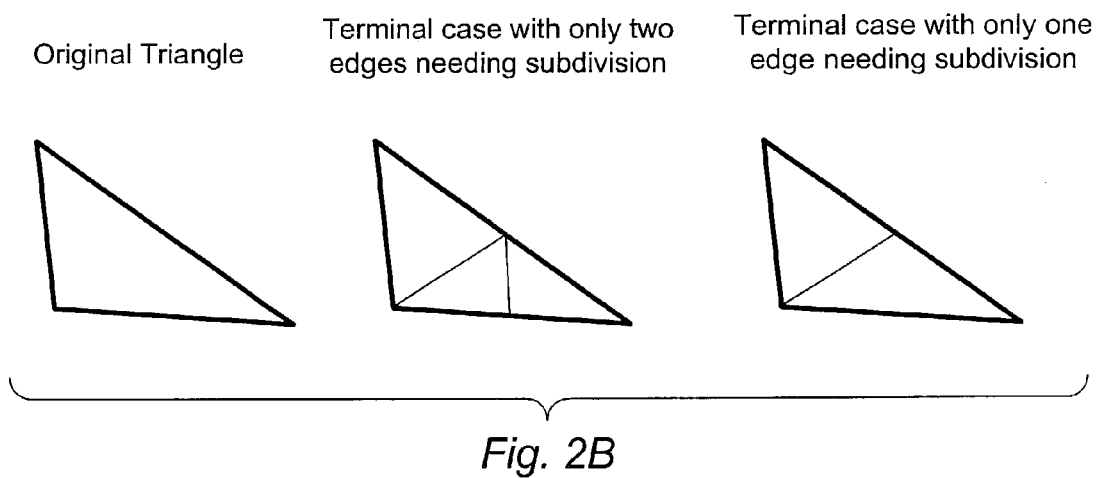
FIG. 2B illustrates several termination criteria for a triangle fragmentation process.

FIG. 2B illustrates means for controlling and terminating a recursive triangle fragmentation. If a triangle resulting from an application of a fragmentation process has all three edges less than or equal to a termination length $L_{term}$, the triangle need not be further fragmented. If a triangle has exactly two edges greater than the termination length $L_{term}$ (as measured in render pixel space), the triangle may be divided into three subtriangles by means of a first segment extending from the midpoint of the longest edge to the opposite vertex, and a second segment extending from said midpoint to the midpoint of the second longest edge. If a triangle has exactly one edge greater than the termination length $L_{term}$, the triangle may be divided into two subtri-angles by a segment extending from the midpoint of the longest edge to the opposite vertex.

Figure 3A:
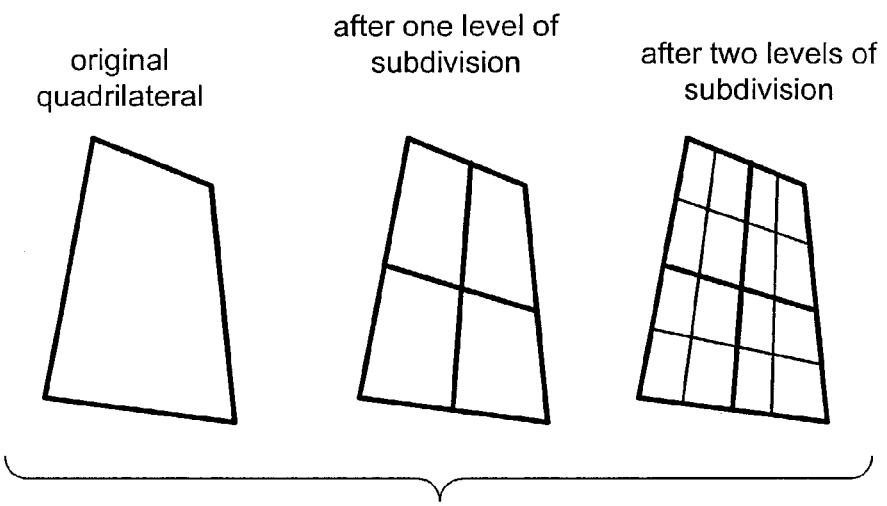
FIG. 3A illustrates one embodiment of a quadrilateral fragmentation process.

Tessellation may also include a quadrilateral fragmentation process that fragments a quadrilateral into four subquadrilaterals by dividing along the two bisectors that each extend from the midpoint of an edge to the midpoint of the opposite edge as illustrated in FIG. 3A. The quadrilateral fragmentation process may be applied recursively to each of the four subquadrilaterals.

Figure 3B:
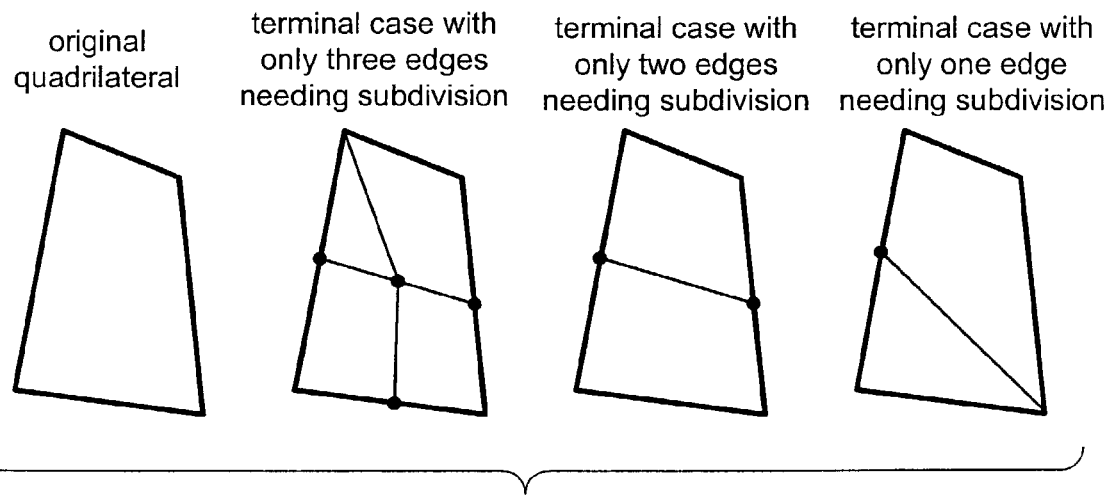
FIG. 3B illustrates several termination criteria for a quadrilateral fragmentation process.

FIG. 3B illustrates means for controlling and terminating a recursive quadrilateral fragmentation. If a quadrilateral resulting from an application of the quadrilateral fragmentation process has all four edges less than or equal to the termination length $L_{term}$, the quadrilateral need not be further fragmented. If the quadrilateral has exactly three edges greater than the termination length $L_{term}$, and the longest and second longest edges are nonadjacent, the quadrilateral may be divided into three subquadrilaterals and a triangle by means of segments extending from an interior point to the midpoints of the three longest edges, and a segment extending from the interior point to the vertex which connects the smallest edge and longest edge. (The interior point may be the intersection of the two lines which each extend from an edge midpoint to the opposite edge midpoint.) If the quadrilateral has exactly two sides greater than the termination length limit $L_{term}$, and the longest edge and the second longest edge are nonadjacent, the quadrilateral may be divided into two subquadrilaterals by means of a segment extending from the midpoint of the longest edge to the midpoint of the second longest edge. If the quadrilateral has exactly one edge greater than the termination length $L_{term}$, the quadrilateral may be divided into a subquadrilateral and a subtriangle by means of a segment extending from the midpoint of the longest edge to the vertex which connects the second longest edge and the third longest edge. The cases given in FIG. 3B are not meant be an exhaustive list of termination criteria.

Figure 4:
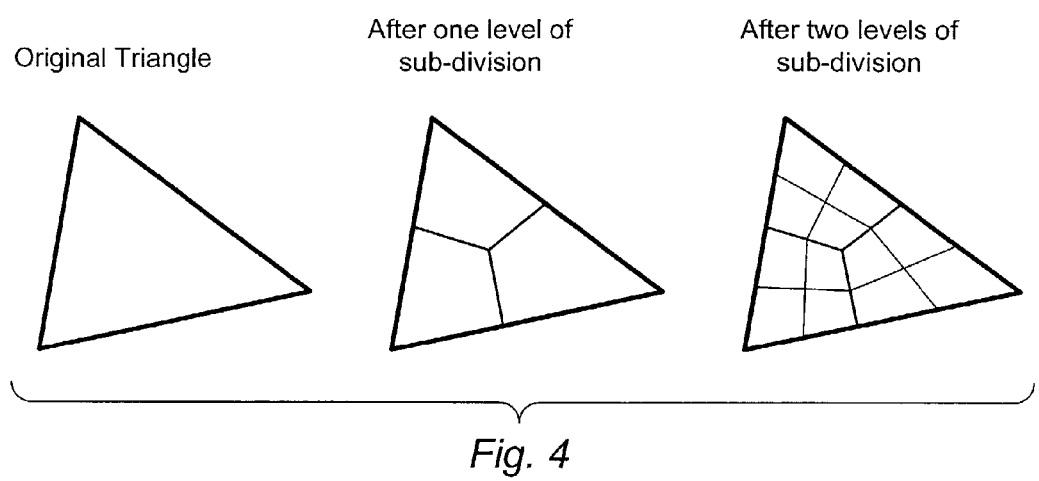
FIG. 4 illustrates one embodiment of a fragmentation process that operates on triangles to generate component quadrilaterals.

In some embodiments, tessellation may include algorithms that divide one type of primitive into components of another type. For example, as illustrated in FIG. 4, a triangle may be divided into three subquadrilaterals by means of segments extending from an interior point (e.g. the triangle centroid) to the midpoint of each edge. (Once the triangle has been the divided into subquadrilaterals, a quadrilateral fragmentation process may be applied recursively to the subquadrilaterals.) As another example, a quadrilateral may be divided into four subtriangles by means of two diagonals that each extend from a vertex of the quadrilateral to the opposite vertex.

Figure 5A:
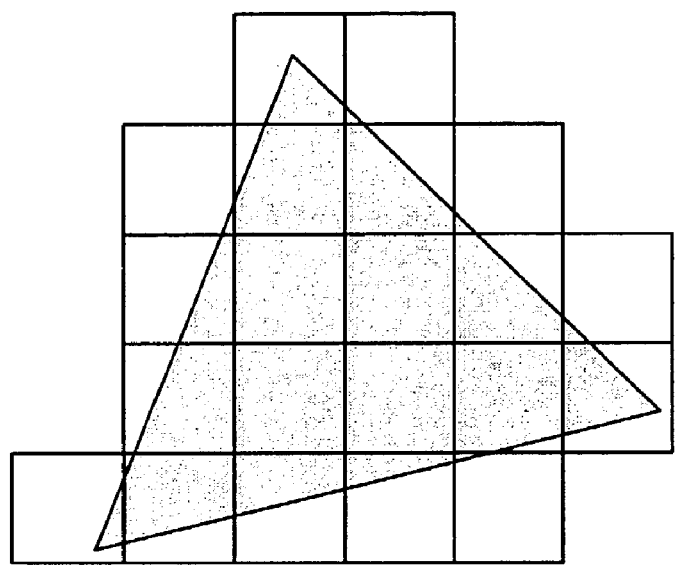
FIGS. 5A and 5B illustrate one embodiment of a method for fragmenting a primitive based on render pixels.
Figure 5B:
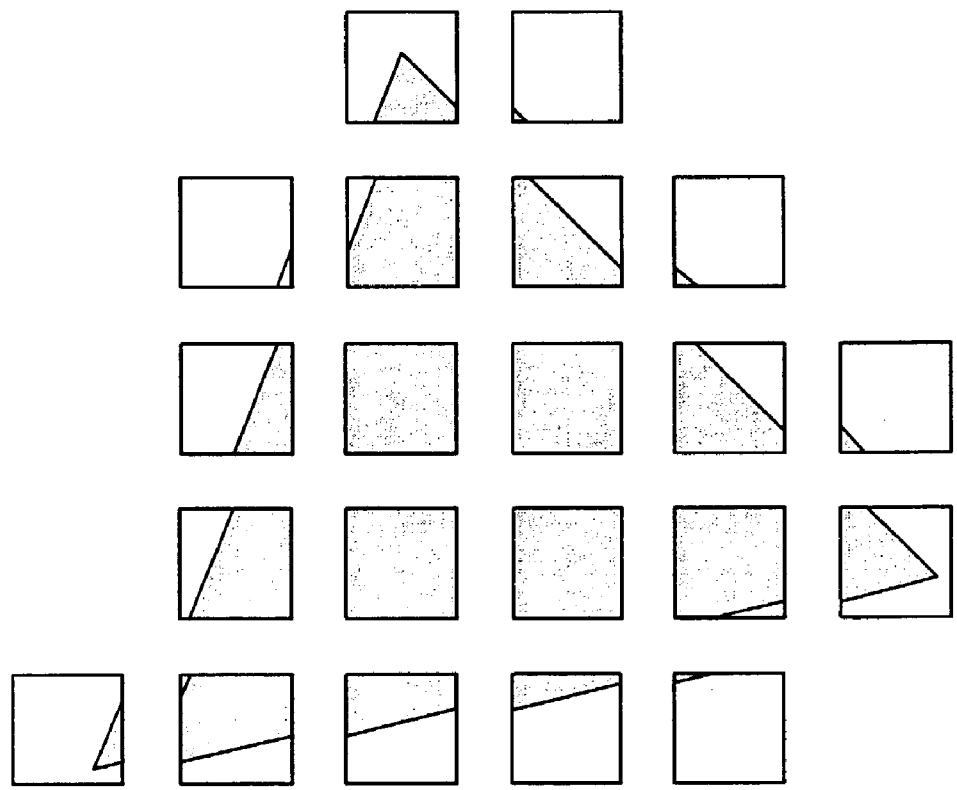

In some embodiments, tessellation may involve the fragmentation of primitives into micropolygons based on an array of render pixels as suggested by FIGS. 5A and 5B. FIG. 5A depicts a triangular primitive as seen in render pixel space. The squares represent render pixels in render pixel space. Thus, the primitive intersects 21 render pixels. Seventeen of these render pixels are cut by one or more edges of the primitive, and four are completely covered by the primitive. A render pixel that is cut by one or more edges of the primitive is referred to herein as a trimmed render pixel (or simply, trimmed pixel). A render pixel that is completely covered by the primitive is referred to herein as a microsquare.

The tessellation process may compute edge-trimming information for each render pixel that intersects a primitive. In one implementation, the tessellation process may compute a slope for an edge of a primitive and an accept bit indicating the side of the edge that contains the interior of the primitive, and then, for each render pixel that intersects the edge, the tessellation process may append to the render pixel (a) the edge's slope, (b) the edge's intercept with the boundary of the render pixel, and (c) the edge's accept bit. The edge-trimming information is used to perform sample fill (described somewhat later).

FIG. 5B illustrates an exploded view of the 21 render pixels intersected by the triangular primitive. Observe that of the seventeen trimmed render pixels, four are trimmed by two primitive edges, and the remaining thirteen are trimmed by only one primitive edge.

In some embodiments, tessellation may involve the use of different fragmentation processes at different levels of scale. For example, a first fragmentation process (or a first set of fragmentation processes) may have a first termination length which is larger than the length limit $L_{max}$. A second fragmentation process (or a second set of fragmentation processes) may have a second termination length which is equal to the length limit $L_{max}$. The first fragmentation process may receive arbitrary sized primitives and break them down into intermediate size polygons (i.e. polygons that have maximum side length less than or equal to the first termination length). The second fragmentation process takes the intermediate size polygons and breaks them down into micropolygons (i.e., polygons that have maximum side length less than or equal to the length limit $L_{max}$).

The rendering pipeline 100 may also support curved surface primitives. The term "curved surface primitive" covers a large number of different non-planar surface patch descriptions, including quadric and Bezier patches, NURBS, and various formulations of sub-division surfaces. Thus, tessellation step 120 may include a set of fragmentation processes that are specifically configured to handle curved surfaces of various kinds.

Given an edge (e.g. the edge of a polygon) defined by the vertices $V_1$ and $V_2$ in camera space, the length of the edge's projection in render pixel space may be computed according to the relation $\|v_2 - v_1\|$, where $v_1$ and $v_2$ are the projections of $V_1$ and $V_2$ respectively into render pixel space, where $\|*\|$ denotes a vector norm such as the $L^1$ norm, the $L^\infty$ norm, or Euclidean norm, or, an approximation to a vector norm. The $L^1$ norm of a vector is the sum of the absolute values of the vector components. The $L^\infty$ norm of a vector is the maximum of the absolute values of the vector components. The Euclidean norm of a vector is the square root of the sum of the squares of the vector components.

In some implementations, primitives may be tessellated into "microquads", i.e., micropolygons with at most four edges. In other implementations, primitives may be tessellated into microtriangles, i.e., micropolygons with exactly three edges. More generally, for any integer $N_S$ greater than or equal to three, a hardware system may be implemented to subdivide primitives into micropolygons with at most $N_S$ sides.

Figure 6:
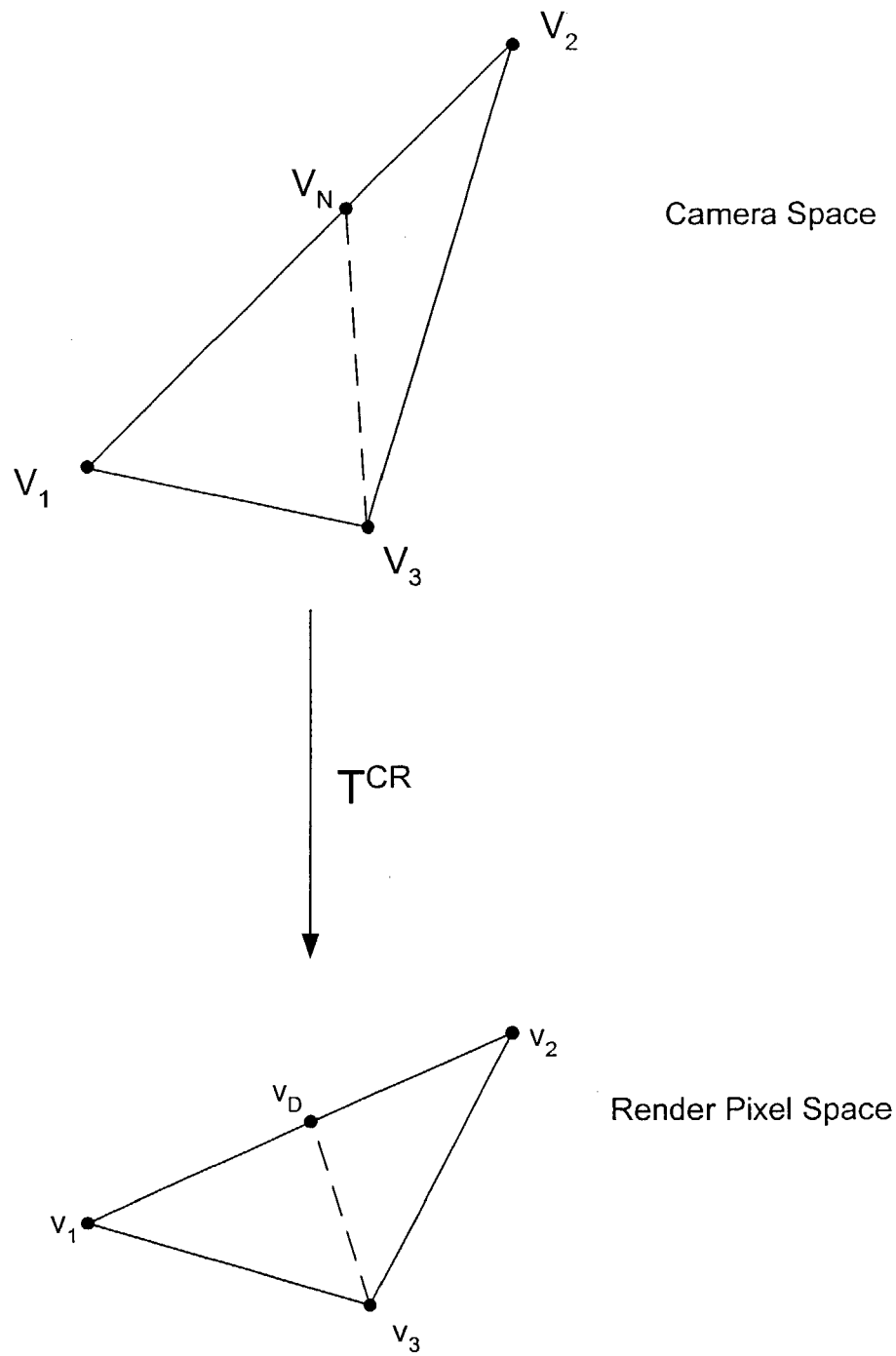
FIG. 6 illustrates a triangle in camera space and its projection into render pixel space.

The tessellation process may involve computations both in camera space and render pixel space as suggested by FIG. 6. A triangle in camera space defined by the vertices $V_1$, $V_2$ and $V_3$ projects onto a triangle in render pixel space defined by the vertices $v_1$, $v_2$ and $v_3$ respectively, i.e., $v_k = T^{CR} V_k$ for k=1, 2, 3. If a new vertex $V_N$ is injected along the edge from $V_1$ to $V_2$, two new subtriangles, having as their common edge the line segment from $V_N$ to $V_3$, may be generated.

Because the goal of the tessellation process is to arrive at component pieces which are sufficiently small as seen in render pixel space, the tessellation process may initially specify a scalar value $\sigma^R$ which defines a desired location $v_D$ along the screen space edge from v1 to v2 according to the relation $v_D = (1-\sigma^R)*v_1 + \sigma^R*v_2$. (For example, one of the fragmentation processes may aim at dividing the screen space edge from v1 to v2 at its midpoint. Thus, such a fragmentation process may specify the value $\sigma^R = 0.5$.) Instead of computing $v_D$ directly and then applying the inverse mapping $(T^{CR})^{-1}$ to determine the corresponding camera space point, the scalar value $\sigma^R$ may then be used to compute a scalar value $\sigma^C$ with the property that the projection of the camera space position $$V_N = (1-\sigma^C)*V_1 + \sigma^C*V_2$$

into render pixel space equals (or closely approximates) the screen space point $v_D$. The scalar value $\sigma^C$ may be computed according to the formula:

$$\sigma^C = \left(\frac{1}{W_2 - W_1}\right)\left(\frac{1}{\frac{1}{W_1} + \sigma^R \cdot \left(\frac{1}{W_2} - \frac{1}{W_1}\right)} - W_1\right),$$

where $W_1$ and $W_2$ are the W coordinates of camera space vertices $V_1$ and $V_2$ respectively. The scalar value $\sigma^C$ may then be used to compute the camera space position $V_N = (1-\sigma^C)*V_1 + \sigma^C*V_2$ for the new vertex. Note that $\sigma^C$ is not generally equal to $\sigma^R$ since the mapping $T^{CR}$ is generally not linear. (The vertices $V_1$ and $V_2$ may have different values for the W coordinate.)

As illustrated above, tessellation includes the injection of new vertices along primitives edges and in the interior of primitives. Data components (such as color, surface normal, texture coordinates, texture coordinate derivatives, transparency, etc.) for new vertices injected along an edge may be interpolated from the corresponding data components associated with the edge endpoints. Data components for new vertices injecting in the interior of a primitive may be interpolated from the corresponding data components associated with the vertices of the primitive.

In step 122, a programmable displacement shader (or a set of programmable displacement shaders) may operate on the vertices of the micropolygons. The processing algorithm(s) implemented by the displacement shader(s) may be programmed by a user. The displacement shader(s) move the vertices in camera space. Thus, the micropolygons may be perturbed into polygons which no longer qualify as micropolygons (because their size as viewed in render pixel space has increased beyond the maximum size constraint). For example, the vertices of a microtriangle which is facing almost "on edge" to the virtual camera may be displaced in camera space so that the resulting triangle has a significantly larger projected area or diameter in render pixel space. Therefore, the polygons resulting from the displacement shading may be fed back to step 120 for tessellation into micropolygons. The new micropolygons generated by tessellation step 120 may be forwarded to step 122 for another wave of displacement shading or to step 125 for surface shading and light shading.

In step 125, a set of programmable surface shaders and/or programmable light source shaders may operate on the vertices of the micropolygons. The processing algorithm performed by each of the surface shaders and light source shaders may be programmed by a user. After any desired programmable surface shading and lighting have been performed on the vertices of the micropolygons, the micropolygons may be forwarded to step 130.

Figure 7:
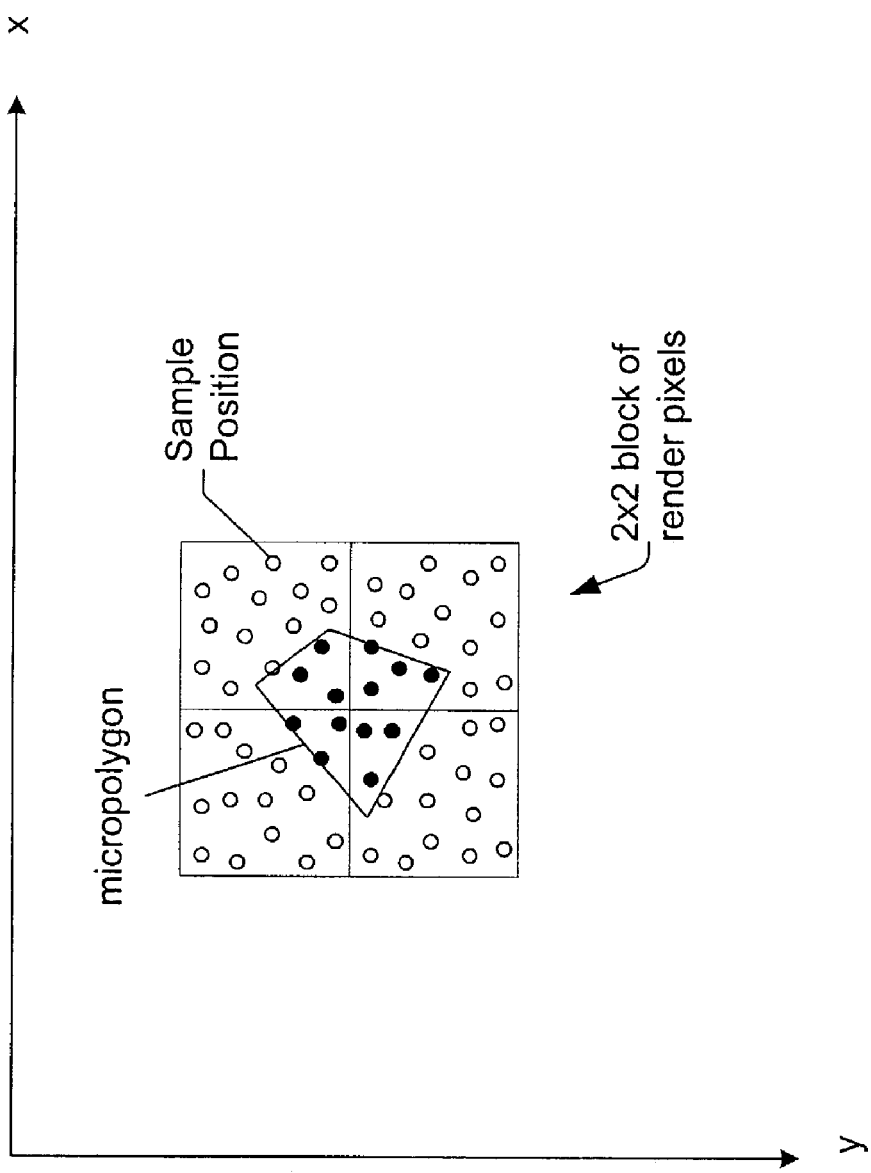
FIG. 7 illustrates a process for filling a micropolygon with samples.

In step 130, a sample fill operation is performed on the micropolygons as suggested by FIG. 7. A sample generator may generate a set of sample positions for each render pixel which has a nonempty intersection with the micropolygon. The sample positions which reside interior to the micropolygon may be identified as such. A sample may then be assigned to each interior sample position in the micropolygon. The contents of a sample may be user defined. Typically, the sample includes a color vector (e.g., an RGB vector) and a depth value (e.g., a z value or a 1/W value).

The algorithm for assigning samples to the interior sample positions may vary from one hardware implementation to the next. For example, according to a "flat fill" algorithm, each interior sample position of the micropolygon may be assigned the color vector and depth value of a selected one of the micropolygon vertices. The selected micropolygon vertex may be the vertex which has the smallest value for the sum x+y, where x and y are the render pixel space coordinates for the vertex. If two vertices have the same value for x+y, then the vertex which has the smaller y coordinate, or alternatively, x coordinate, may be selected. Alternatively, each interior sample position of the micropolygon may be assigned the color vector and depth value of the closest vertex of the micropolygon vertices.

According to an "interpolated fill" algorithm, the color vector and depth value assigned to an interior sample position may be interpolated from the color vectors and depth values already assigned to the vertices of the micropolygon.

According to a "flat color and interpolated z" algorithm, each interior sample position may be assigned a color vector based on the flat fill algorithm and a depth value based on the interpolated fill algorithm.

The samples generated for the interior sample positions are stored into a sample buffer 140. Sample buffer 140 may store samples in a double-buffered fashion (or, more generally, in an multi-buffered fashion where the number N of buffer segments is greater than or equal to two). In step 145, the samples are read from the sample buffer 140 and filtered to generate video pixels.

Figure 8:
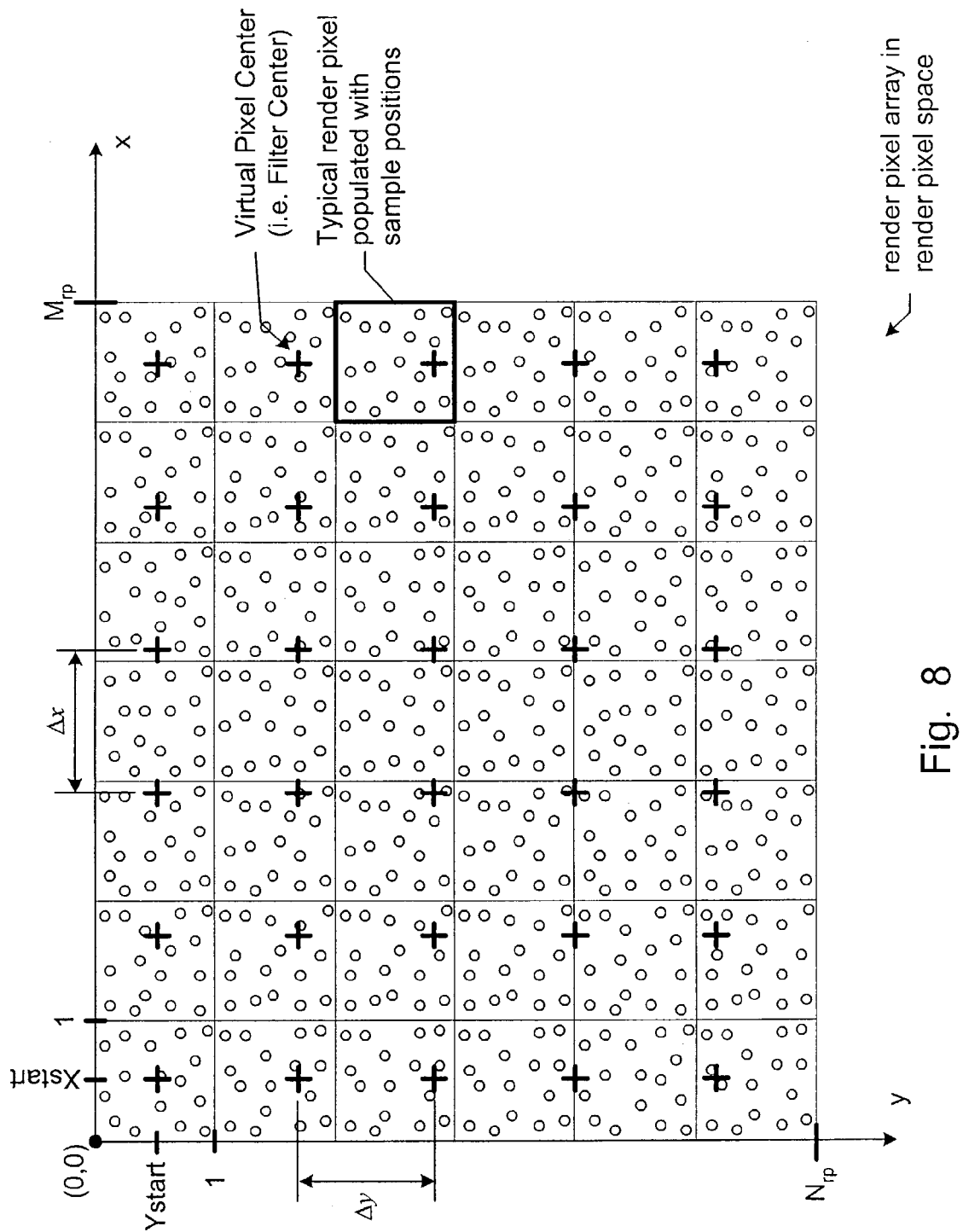
FIG. 8 illustrates an array of virtual pixel positions superimposed on an array of render pixels in render pixel space.

The rendering pipeline 100 may be configured to render primitives for an $M_{rp} \times N_{rp}$ array of render pixels in render pixel space as suggested by FIG. 8. Each render pixel may be populated with $N_{sd}$ sample positions. The values $M_{rp}$, $N_{rp}$ and $N_{sd}$ are user-programmable parameters. The values $M_{rp}$ and $N_{rp}$ may take any of a wide variety of values, especially those characteristic of common video formats.

The sample density $N_{sd}$ may take any of a variety of values, e.g., values in the range from 1 to 16 inclusive. More generally, the sample density $N_{sd}$ may take values in the interval $[1, M_{sd}]$, where $M_{sd}$ is a positive integer. It may be convenient for $M_{sd}$ to equal a power of two such as 16, 32, 64, etc. However, powers of two are not required.

The storage of samples in the sample buffer 140 may be organized according to memory bins. Each memory bin corresponds to one of the render pixels of the render pixel array, and stores the samples corresponding to the sample positions of that render pixel.

The filtering process may scan through render pixel space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position $(X_{start}, Y_{start})$. The horizontal displacement $\Delta X$, vertical displacement $\Delta Y$ and the start coordinates $X_{start}$ and $Y_{start}$ are programmable parameters. Thus, the size of the render pixel array may be different from the size of the video pixel array.

Figure 9:
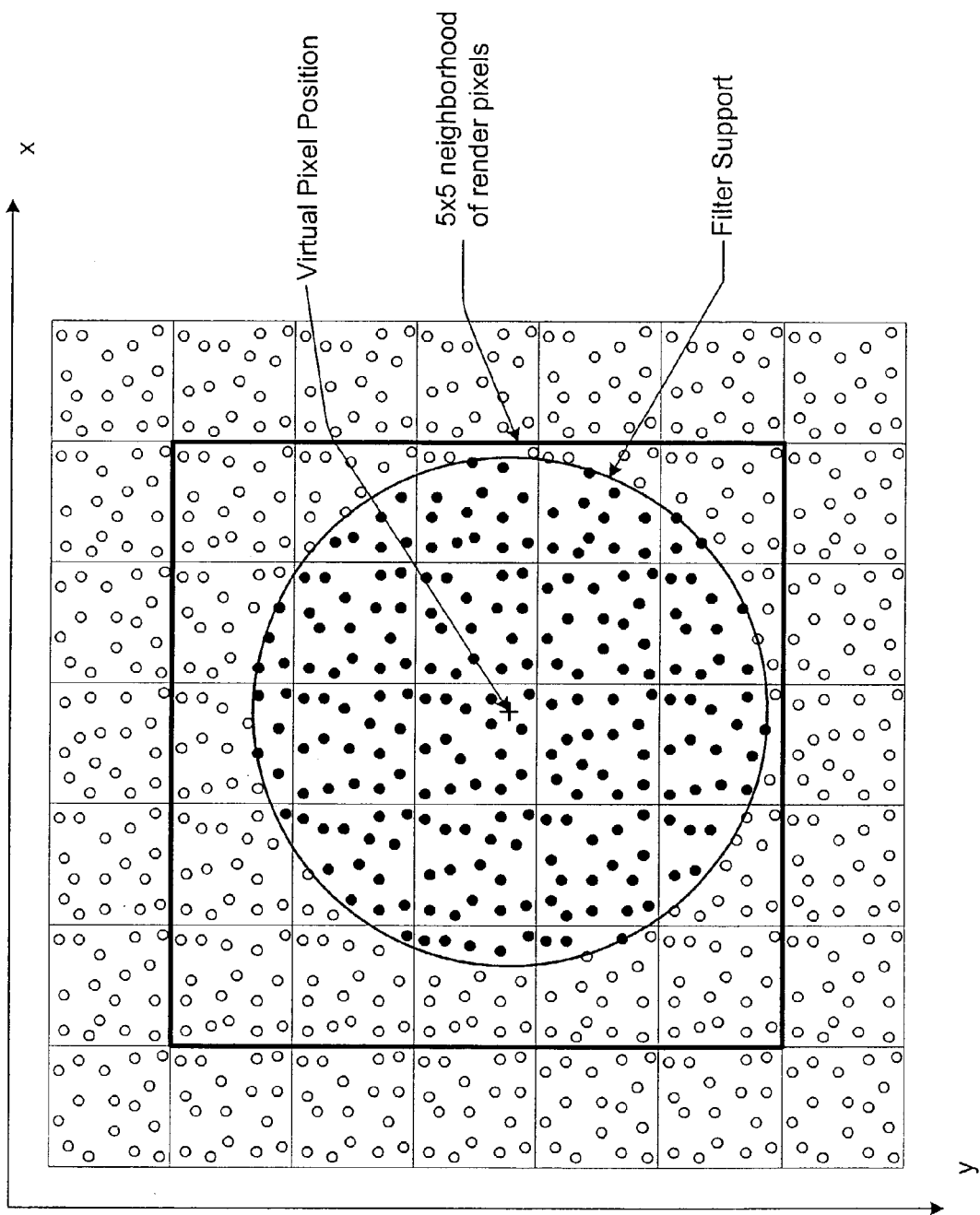
FIG. 9 illustrates the computation of a pixel at a virtual pixel position (denoted by the plus marker) according to one set of embodiments.

The filtering process may compute a video pixel at a particular virtual pixel position as suggested by FIG. 9. The filtering process may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering process may compute an initial red value $r_P$ for the video pixel P according to the expression $$r_P = \Sigma C_S r_S,$$

where the summation ranges over each sample S in the filter support region, and where $r_S$ is the red color component of the sample S. In other words, the filtering process may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering process may compute a normalization value E by adding up the filter coefficients $C_S$ for the samples S in the filter support region, i.e., $$E = \Sigma C_S.$$

The initial pixel values may then be multiplied by the reciprocal of E (or equivalently, divided by E) to determine normalized pixel values:

$$R_P = (1/E) * r_P$$

$$G_P = (1/E) * g_P$$

$$B_P = (1/E) * b_P$$

$$A_P = (1/E) * \alpha_P.$$

The filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in render pixel space on which the filter is defined. The terms "filter" and "kernel" are used as synonyms herein. Let $R_f$ denote the radius of the circular support disk.

Figure 10:
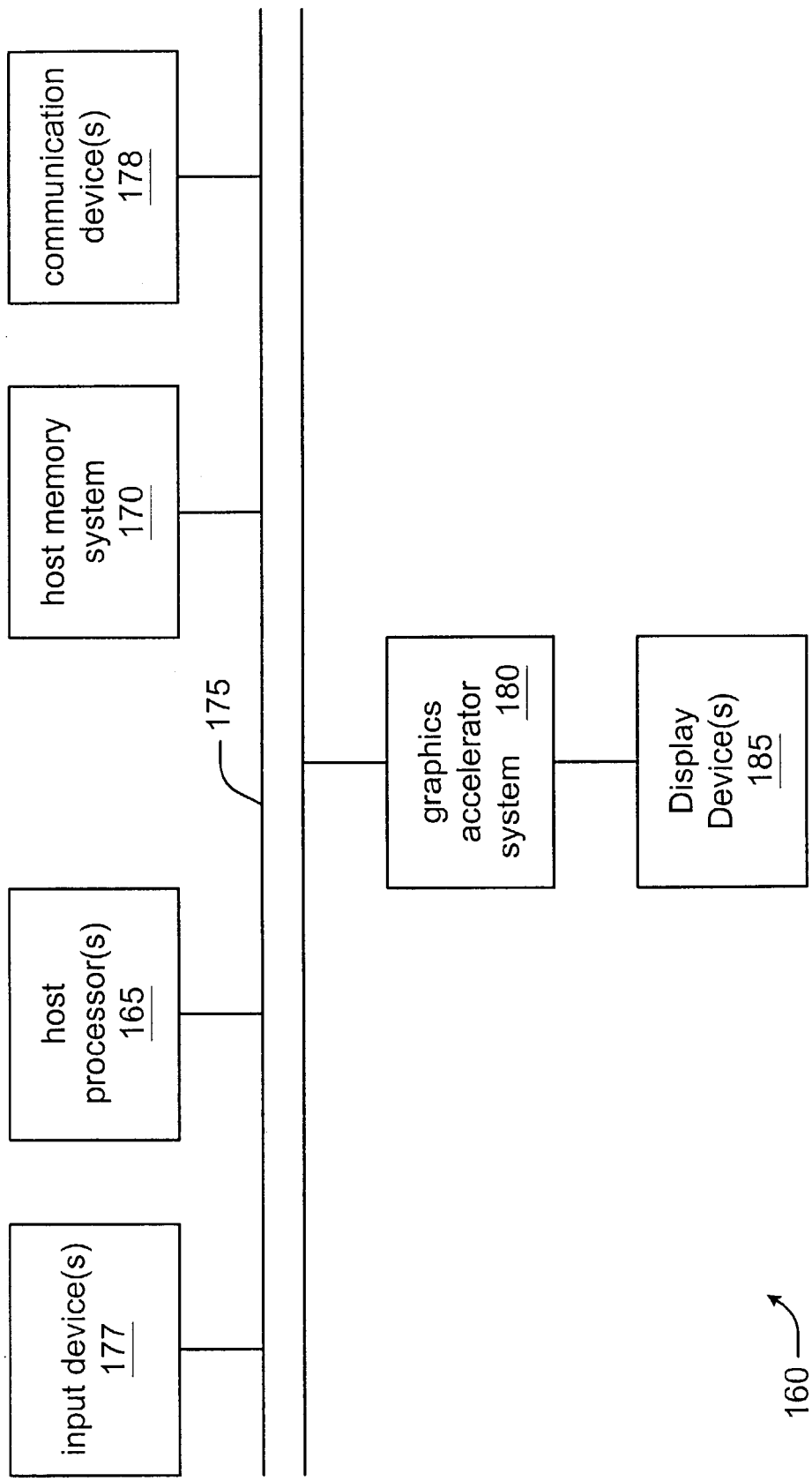
FIG. 10 illustrates one set of embodiments of computational system configured to perform graphical rendering computations.

FIG. 10 illustrates one set of embodiments of a computational system 160 operable to perform graphics rendering computations. Computational system 160 includes a set of one or more host processors 165, a host memory system 170, a set of one or more input devices 177, a graphics accelerator system 180 (also referred to herein as a graphics accelerator), and a set of one or more display devices 185. Host processor(s) 165 may couple to the host memory system 170 and graphics system 180 through a communication medium such as communication bus 175, or perhaps, through a computer network.

Host memory system 170 may include any desired set of memory devices, e.g., devices such as semiconductor RAM and/or ROM, CD-ROM drives, magnetic disk drives, magnetic tape drives, bubble memory, etc. Input device(s) 177 include any of a variety of devices for supplying user input, i.e., devices such as a keyboard, mouse, track ball, head position and/or orientation sensors, eye orientation sensors, data glove, light pen, joystick, game control console, etc. Computational system 160 may also include a set of one or more communication devices 178. For example, communication device(s) 178 may include a network interface card for communication with a computer network.

Graphics system 180 may be configured to implement the graphics computations associated with rendering pipeline 100. Graphics system 180 generates a set of one or more video signals (and/or digital video streams) in response to graphics data received from the host processor(s) 165 and/or the host memory system 170. The video signals (and/or digital video streams) are supplied as outputs for the display device(s) 185.

In one embodiment, the host processor(s) 165 and host memory system 170 may reside on the motherboard of a personal computer (or personal workstation). Graphics system 180 may be configured for coupling to the motherboard.

Figure 11:
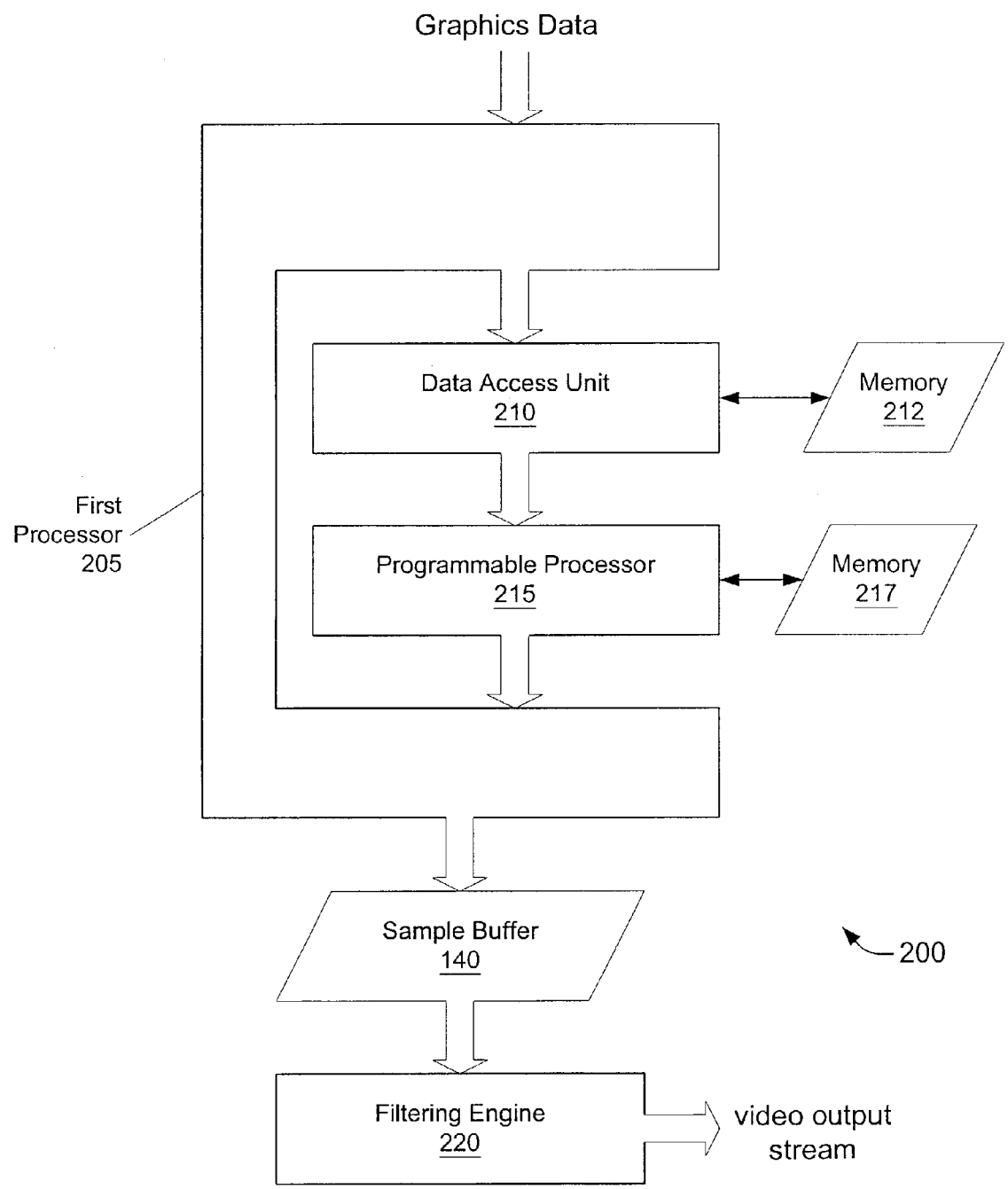
FIG. 11 illustrates one embodiment of a graphics system configured to perform per pixel programming shading.

The rendering pipeline 100 may be implemented in hardware in a wide variety of ways. For example, FIG. 11 illustrates one embodiment of a graphics system 200 which implements the rendering pipeline 100. Graphics system 200 includes a first processor 205, a data access unit 210, programmable processor 215, sample buffer 140 and filtering engine 220. The first processor 205 may implement steps 110, 112, 115, 120 and 130 of the rendering pipeline 100. Thus, the first processor 205 may receive a stream of graphics data from a graphics processor, pass micropolygons to data access unit 210, receive shaded micropolygons from the programmable processor 215, and transfer samples to sample buffer 140. In one set of embodiments, graphics system 200 may serve as graphics accelerator system 180 in computational system 160.

The programmable processor 215 implements steps 122 and 125, i.e., performs programmable displacement shading, programmable surface shading and programmable light source shading. The programmable shaders may be stored in memory 217. A host computer (coupled to the graphics system 200) may download the programmable shaders to memory 217. Memory 217 may also store data structures and/or parameters which are used and/or accessed by the programmable shaders. The programmable processor 215 may include one or more microprocessor units which are configured to execute arbitrary code stored in memory 217.

Data access unit 210 may be optimized to access data values from memory 212 and to perform filtering operations (such as linear, bilinear, trilinear, cubic or bicubic filtering) on the data values. Memory 212 may be used to store map information such as bump maps, displacement maps, surface texture maps, shadow maps, environment maps, etc. Data access unit 210 may provide filtered and/or unfiltered data values (from memory 212) to programmable processor 215 to support the programmable shading of micropolygon vertices in the programmable processor 215.

Data access unit 210 may include circuitry to perform texture transformations. Data access unit 210 may perform a texture transformation on the texture coordinates associated with a micropolygon vertex. Furthermore, data access unit 210 may include circuitry to estimate a mip map level λ from texture coordinate derivative information. The result of the texture transformation and the MML estimation may be used to compute a set of access addresses in memory 212. Data access unit 210 may read the data values corresponding to the access addresses from memory 212, and filter the data values to determine a filtered value for the micropolygon vertex. The filtered value may be bundled with the micropolygon vertex and forwarded to programmable processor 215. Thus, the programmable shaders may use filtered map information to operate on vertex positions, normals and/or colors, if the user so desires.

Filtering engine 220 implements step 145 of the rendering pipeline 100. In other words, filtering engine 220 reads samples from sample buffer 140 and filters the samples to generate video pixels. The video pixels may be supplied to a video output port in order to drive a display device such as a monitor, a projector or a head-mounted display.

Filtered Shadow Mapping

Figure 12:
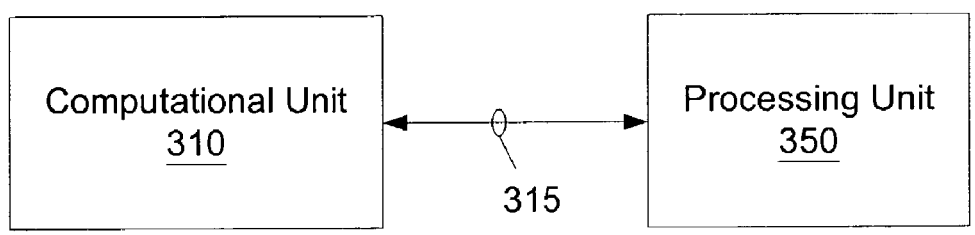
FIG. 12 illustrates a computational unit 310 coupled to a processing unit 350 through a communication bus 315.

In one set of embodiments, a graphical processing system may include a computational unit 310 coupled to a processing unit 350 through a communication bus 315 as suggested by FIG. 12. The graphical processing system may conform to any of a variety of system architectures. In some embodiments, the graphical processing system may be a graphics accelerator system (such as accelerator system 180) conforming to the rendering pipeline 100.

In other embodiments, the graphical processing system may be a graphics accelerator such as the graphics accelerator 100 of U.S. patent application Ser. No. 10/195,859, filed on Jul. 15, 2002, entitled "Statistic Logic for Collecting a Histogram of Pixel Exponent Values", invented by Alan Cheung and Michael Deering. This patent application (Ser. No. 10/195,859) is hereby incorporated by reference in its entirety. In one embodiment, the computational unit 310 may be identified with the rendering unit 320 of U.S. Ser. No. 10/195,859.

Computational unit 310 and processing unit 350 may be implemented on separate integrated circuits. Computational unit 310 may receive (or generate) a collection of points P in camera space (or virtual world space) corresponding to an ensemble of objects. For each point P, computational unit 310 may:

(a) send a shadow request $REQ_P$ to processing unit 350,
(b) receive from processing unit 350 a shadow fraction $\beta_P$, and
(c) modify (e.g., scale) color information $C_P$ corresponding to point P with the shadow fraction $\beta_P$.

The shadow fraction $\beta_P$ indicates the extent to which point P lies in the shadow of a given light source LS. In one embodiment, $\beta_P$ equal to zero indicates that point P lies in total shadow with respect to light source LS, and $\beta_P$ indicates that point P lies in total illumination with respect to light source LS.

Figure 13:
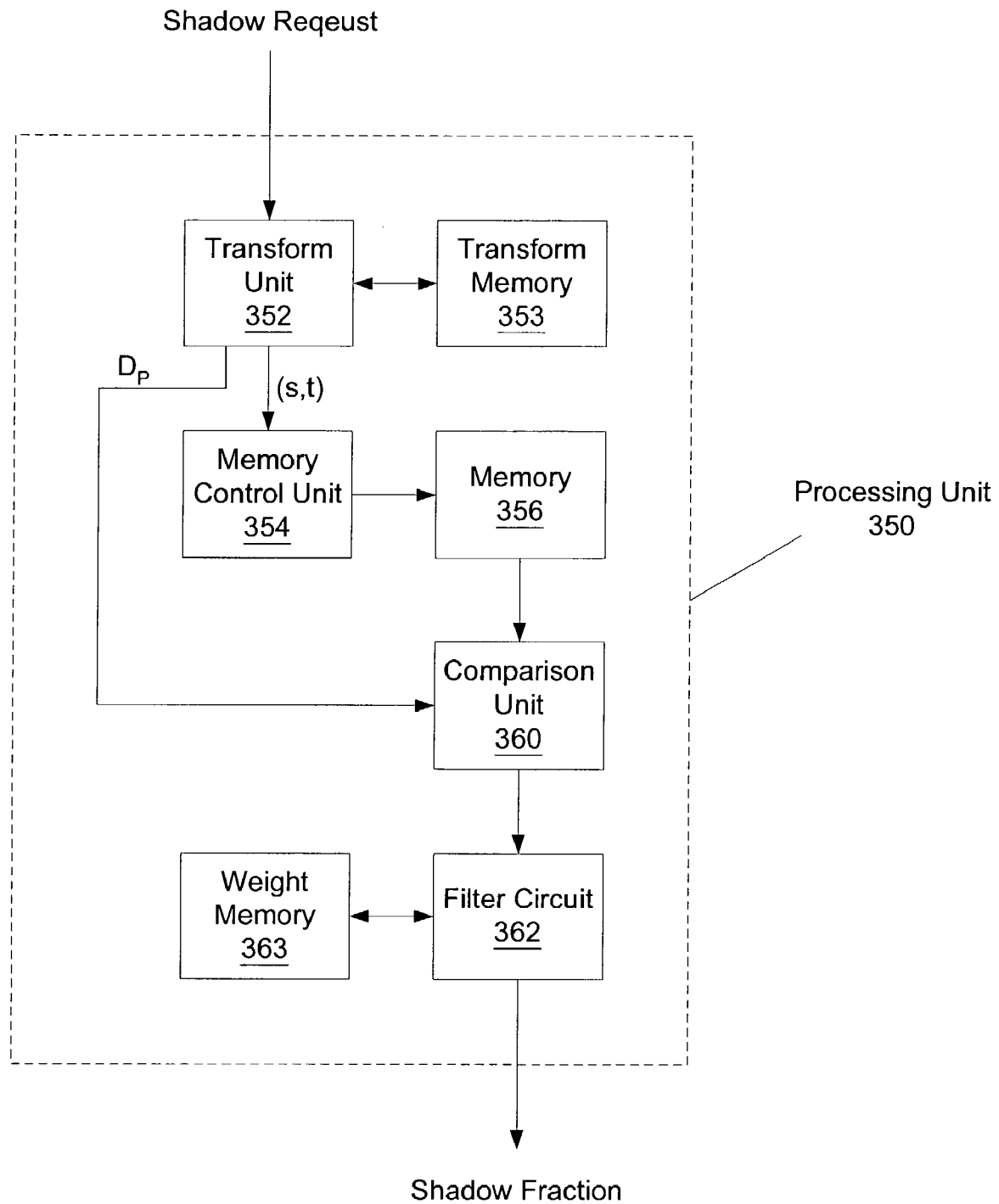
FIG. 13 illustrates one set of embodiments for processing unit 350.
Figure 14:
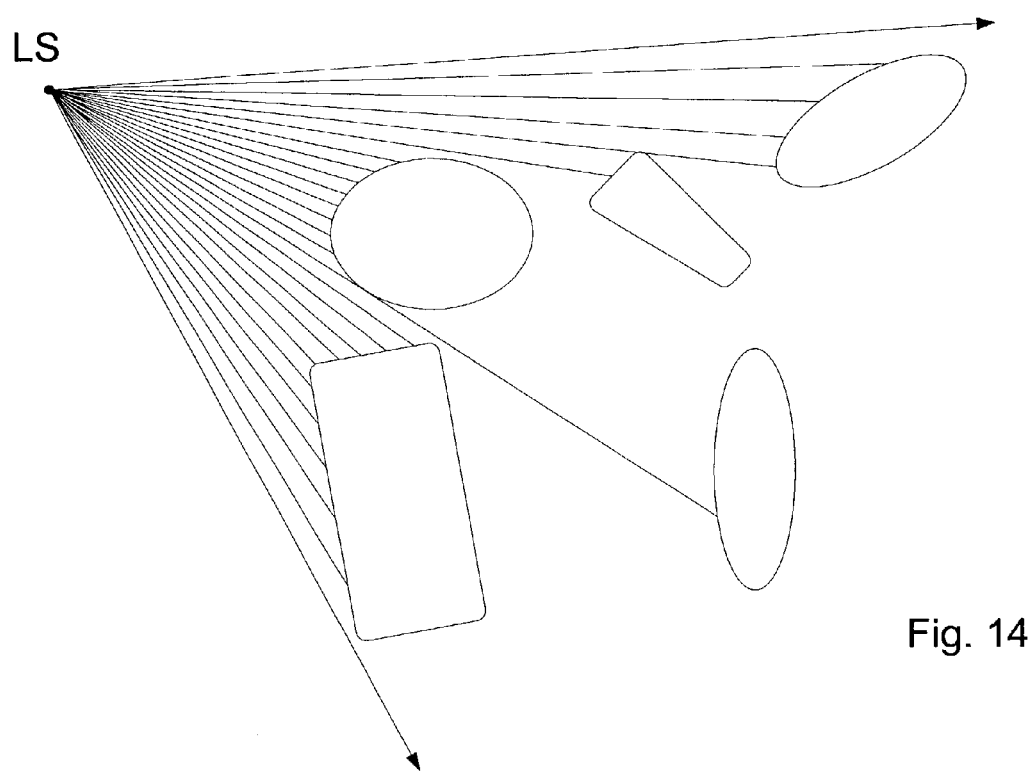
FIG. 14 illustrates the process of generating a shadow depth image with respect to a given light source LS.

Processing unit 350 may include a memory 356 as suggested by FIG. 13. Memory 356 may include random access memory (RAM) such as dynamic random access memory. A shadow map corresponding to the light source LS may be stored in memory 356. The shadow map comprises an array of depth values (generated in a preliminary rendering pass). Each depth value represents a distance (or extent) from the light source to a first occluding intersection with an object (e.g., the first intersection with an opaque object) along a ray emanating from the light source as suggested by the two-dimensional analogy presented in FIG. 14.

Processing unit 350 may also include a transform unit 352, a memory control unit 354, a comparison unit 360 and a filter circuit 362.

In some embodiments, the shadow request $REQ_P$ asserted by computational unit 310 includes the coordinates of the point P in camera space (or render pixel space). Transform unit 352 may operate on the camera space (or render pixel space) coordinates of the point P with a transformation T to generate shadow space coordinates (s,t) of the point P and a depth $D_P$ of the point P with respect to the light source LS. The shadow space coordinates (s,t) of the point P may be provided to memory control unit 354 and the depth $D_P$ is provided to comparison unit 360.

The transformation T may be stored in transform memory 353. The transformation T may be the composition of several component transformations. For example, transformation T may involve a change of coordinates from the current camera space to the camera space (rooted at the light source) in effect during the preliminary rendering pass, and a perspective division operation. The transformation T may be downloaded to transform memory 353 in response to a command asserted by host software (i.e., by software executing on a host computer).

Memory control unit 354 induces the transfer of a neighborhood $N_P$ of depth values from the shadow map stored in memory 356 to comparison unit 360, where the neighborhood $N_P$ is defined by the shadow space coordinates (s,t) of the point P. The neighborhood $N_P$ may have any of a wide variety sizes and shapes.

Figure 15:
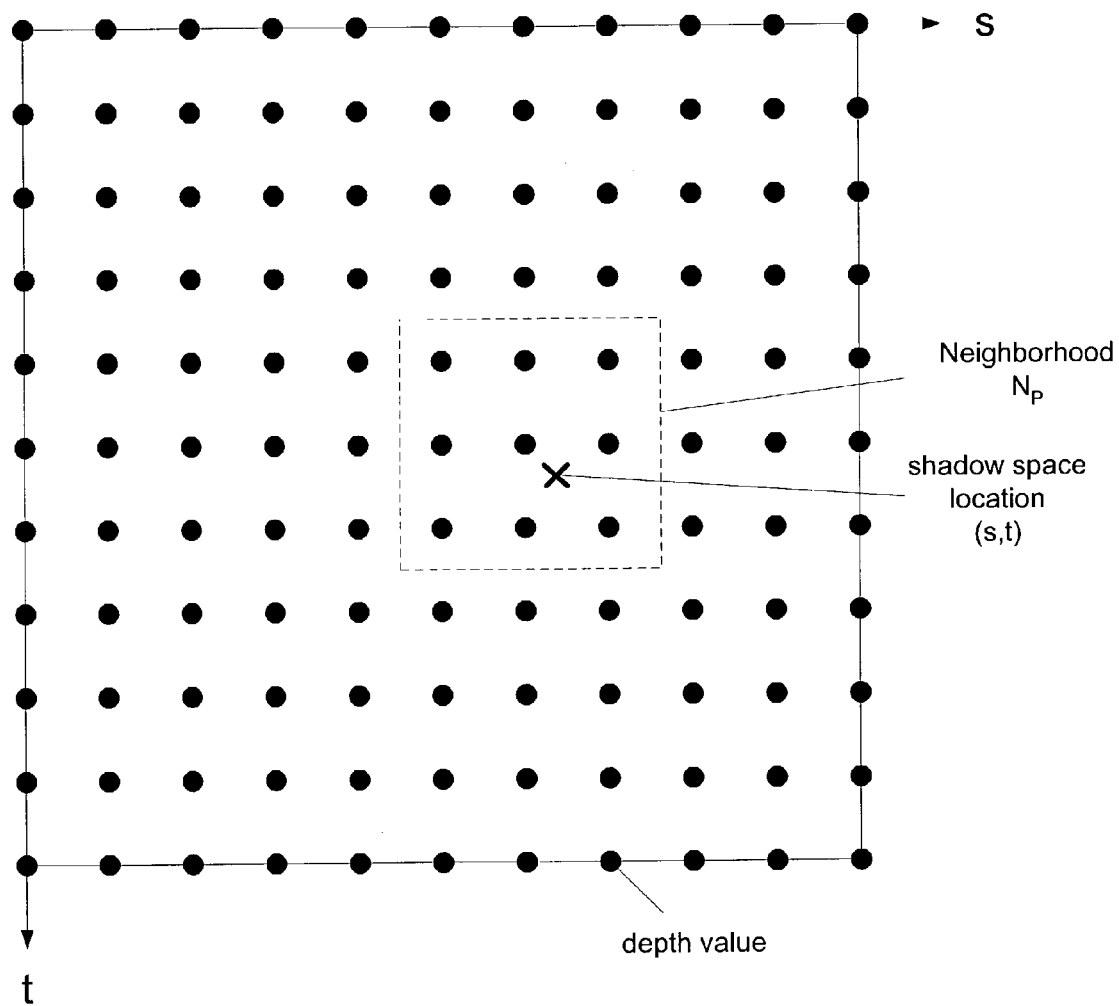
FIG. 15 illustrates a shadow map comprising an array of depth values, and a neighborhood of depth values surrounding a shadow space location (s,t)

FIG. 15 illustrates one example of a neighborhood $N_P$ corresponding to coordinates (s,t). The shadow space coordinates s and t may be rounded (or truncated) to map addresses S and T:

$S=Round(s)$ and $T=Round(t)$.

The neighborhood $N_P$ may be defined as the set of depth values with two-dimensional addresses (S+I,T+J), where $I=-W_N, -W_N+1, -W_N+2, \ldots, -1, 0, 1, 2, \ldots,$
$W_N-2, W_N-1, W_N,$ and $J=-W_N, -W_N+1, -W_N+2, \ldots, -1, 0, 1, 2, \ldots,$
$W_N-2, W_N-1, W_N,$ where $W_N$ is the width of the neighborhood. The width $W_N$ is a nonnegative integer value. For example, $W_N$ may equal a value in the range _____.

The neighborhood $N_P$ is not required to be square or rectangular. In other embodiments, the neighborhood $N_P$ may be circular (or elliptical). In some embodiments, the size (radius) of the neighborhood $N_P$ may be programmable.

Comparison unit 360 receives the depth values d(S+I,T+J) in the neighborhood $N_P$ from memory 356, and compares each depth value d(S+I,T+J) to the depth value $D_P$ of the point P to generate a Boolean resultant $U_{I,J}$:

$U_{I,J}=(D_P \leq d(S+I,T+J)+K_{bias})$.

Figure 16:
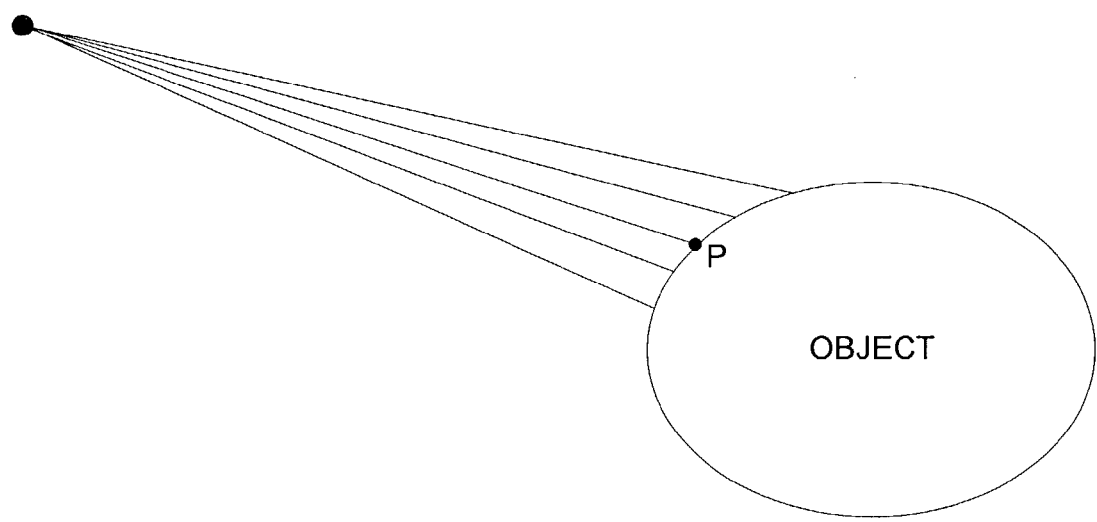
FIG. 16 illustrates a point P on a visible object and neighboring points on the same object.

The Boolean resultant $U_{I,J}$ indicates whether the depth value $D_P$ of the point P is less than or equal to (or, in one alternative embodiment, simply less than) the depth value d(S+I,T+J) plus a small positive bias $K_{bias}$. Use of the bias constant prevents points nearby to P on the same visible surface (i.e. visible from the point of view of the light source as suggested by FIG. 16) from reporting a negative result in the distance comparison. The bias constant $K_{bias}$ may be programmable. The Boolean results $U_{I,J}$ are forwarded to filter circuit 362.

Filter circuit 362 applies a filtering operation to the Boolean results $U_{I,J}$ to generate the shadow fraction $\beta_P$ for point P. For example, the filtering circuit may compute a weighted average of the Boolean results according to the expression:

$\beta_P = \Sigma U_{I,J} W_{I,J}$, where (I,J) ranges through the neighborhood $N_P$. The filter weights $W_{I,J}$ determine the type of filter that is applied. The filter weight $W_{I,J}$ for Boolean result $U_{I,J}$ may depend on the displacement ($\Delta S, \Delta T$) between the shadow space image (s,t) of point P and the comparison point (S+I,T+J):

$\Delta S = s-(S+I) = (s-S)+I$, $\Delta T = t-(T+J) = (t-T)+J$.

For example, in one embodiment, a tent filter may be realized by setting $W_{I,J}$ according to the relation $W_{I,J} = \min\{K_2-K_1|\Delta S|, K_2-K_1|\Delta T|\}$, or the relation $W_{I,J} = \begin{cases} K_2 - K_1|\Delta S| & \text{if } |\Delta S| < |\Delta T| \\ K_2 - K_1|\Delta T| & \text{otherwise} \end{cases}$, where $K_1$ and $K_2$ are constants. In some embodiments, constants $K_1$ and $K_2$ may be programmable.

In one embodiment, filter circuit 362 includes a length computation circuit and a weight memory 363. The length computation circuit computes a length (or square of length) of the displacement ($\Delta S, \Delta T$). The filter circuit 362 may use the displacement length to read the weight $W_{I,J}$ from the weight memory 363. The values in the weight memory 363 may be programmable. The length computation circuit may determine the displacement length based on the calculation of a vector norm such as the Euclidean norm, the $L^1$ norm, the $L^{infinity}$ norm, etc. The $L^1$ norm of a vector is the sum of the absolute values of the vector components. The $L^{infinity}$ norm of a vector is the maximum of the absolute values of the vector components.

Filtering circuit 362 may include a network of multipliers and adders to perform the weighted summation indicated above. In one embodiment, filtering circuit 362 may include an adder tree for efficient parallel computation of the summation. The products $U_{I,J} W_{I,J}$ may be presented to a first stage of the adder tree, and the summation result may be output from a last stage of the adder tree.

Memory 356 has been described as a storage for shadow map information. However, it should be noted that memory 356 may be used to store any desired type of information, especially those types of information on which filtering is to be performed.

In one set of embodiments, the processing unit 350 is implemented as an integrated circuit. Because the memory 356, comparison unit 360 and filtering circuit 362 are located on the same integrated circuit, the depth values stored in the memory 356 may be provided at a high rate to the comparison unit 360, and filtering circuit 362 may generate a large number of shadow fractions $\beta_P$ per second. This scheme (A) of collocating the memory 356, the comparison unit and the filtering circuit is more efficient in its use of transfer bandwidth on communication bus 315 than the alternative scheme (B) of locating the comparison operation and the filtering operation in computational unit 310.

The later scheme (B) would require the transfer of the depth values from memory 356 to computational unit 310. It is noted that a bandwidth savings may also be realized by locating the comparison unit in processing unit 350 and locating the filter circuit in computational unit 310 because in this case only the Boolean results $U_{I,J}$ need to be transferred across the communication bus 315. The Boolean results $U_{I,J}$ take up much less space than the corresponding depth values d(S+I,T+J).

In some embodiments, the memory 356 may be located external to processing unit 350. In this case, memory 356 may include a set of one or more RAM chips. Processing unit 350 may couple to the RAM chips through a fast dedicated connection. For example, the dedicated connection may provide interleaved access to the depth values stored in the RAM chips. In one embodiment, adjacent depth values in a shadow map may be stored in separate RAM chips for faster parallel access. Thus, even though the memory 356 is located external to the processing unit 350, many of the same advantages are experienced as with scheme (A) because of the fast dedicated connection to the memory 356.

Processing unit 350 may operate in a pipelined fashion. For example, filter circuit may perform a filtering operation on Boolean results corresponding to a first point P1, while memory control unit 354 is directing memory 356 to read out depth values corresponding to a second point P2, while transform unit 352 is computing the transform of a third point P3. Various way of pipelining the computations in processing unit 350 are contemplated.

In one collection of embodiments, processing unit 350 may be configured to perform shadow filtering for a plurality of shadow maps corresponding respectively to a plurality of light sources. Transform memory 353 may have sufficient capacity to store a plurality of transforms, each transform corresponding to one of the plurality of light sources. Memory 356 may have sufficient capacity to store the plurality of shadow maps. Furthermore, weight memory 363 may have sufficient capacity to store a plurality of weight sets, each weight set to be used for filtering with respect to a corresponding one of the shadow maps. In addition to the coordinates of point P in camera space (or screen space), the shadow request $REQ_P$ asserted by computational unit 310 may include a light source ID which designates one of the plurality of light sources. The transform unit 352 may use the light source ID to access the appropriate transform for the designated light source from transform memory 353. Memory control unit 354 may use the light source ID to induce the transfer of depth values from a corresponding shadow map stored in memory 356 to comparison unit 360. Filtering circuit 362 may use the light source ID to access a corresponding set of filter weights from weight memory 363. Thus, processing unit 350 returns to computational unit 310 a shadow fraction which corresponds to the designated light source. The shadow request $REQ_P$ for point P may include one or more light source IDs. Processing unit 350 may service the one or more light source IDs in a pipelined fashion.

Computational unit 310 may be configured to perform any desired set of rendering computations. In one embodiment, computational unit 310 may be identified with data access unit 210 of FIG. 11, and one or more copies of the processing unit 350 may reside in memory 212 of FIG. 11. In another embodiment, computational unit 310 may be identified with programmable processor 215 of FIG. 11. In yet another embodiment, computational unit 310 may be identified with the first processor 205 of FIG. 11.

Figure 17:
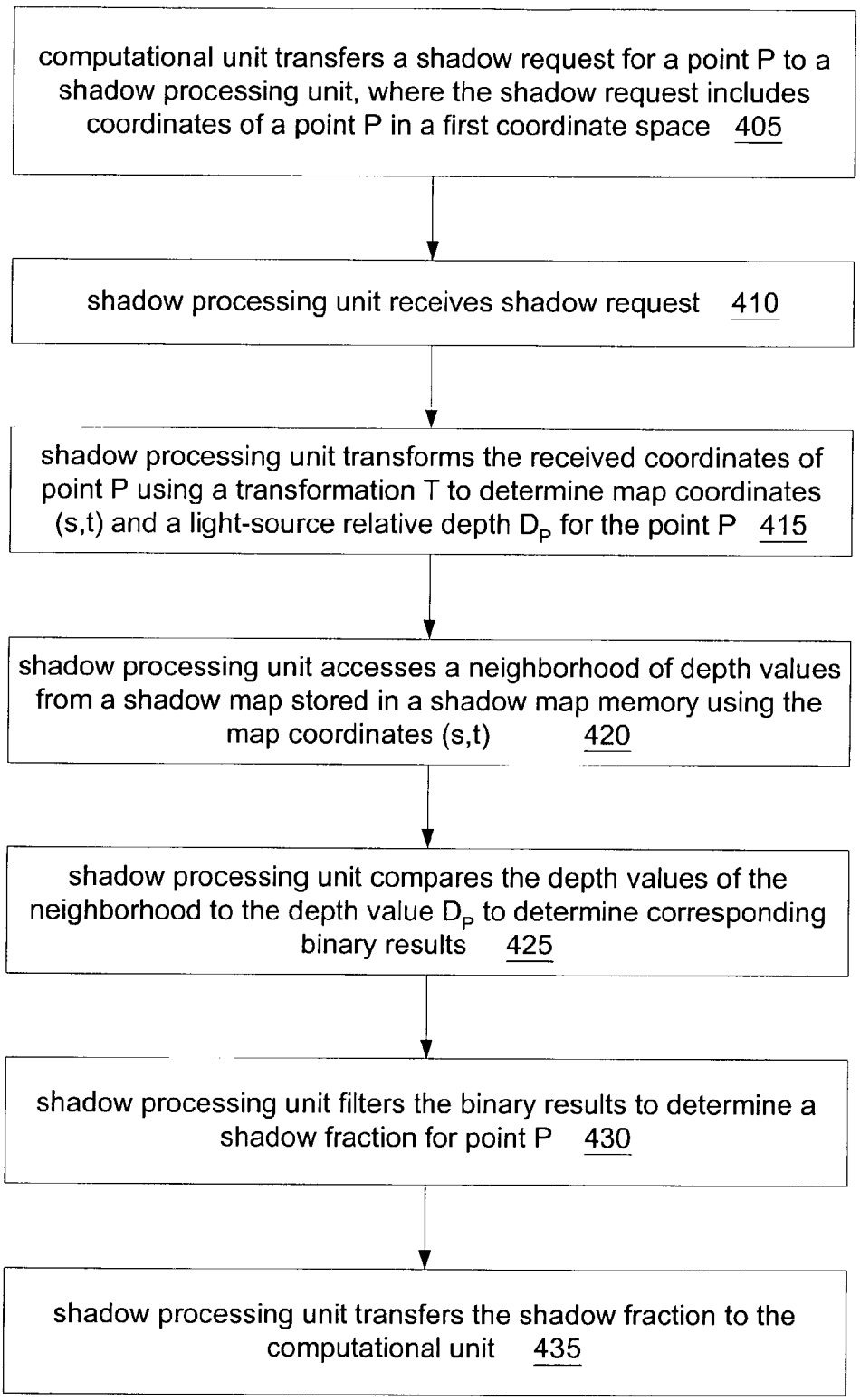
FIG. 17 illustrates one embodiment of a method for applying a shadow to objects in a scene.

In some embodiments, a method for performing shadow filtering may be arranged as illustrated in FIG. 17. In step 405, the computational unit (such as the computational unit 310 of FIG. 12) may transfer a shadow request for a point P to a shadow processing unit (such as processing unit 350 of FIG. 12). The shadow request may include the coordinates of the point P in a first coordinate space (e.g., virtual world space or screen space).

In step 410, the shadow processing unit receives the shadow request.

In step 415, the shadow processing unit may transform the received coordinates of the point P using a transformation T to determine map coordinates (s,t) and a depth $D_P$ relative to a light source LS. The transformation T is programmably defined.

In step 420, the shadow processing unit accesses a neighborhood of depth values from a shadow map stored in a shadow map memory using the map coordinates (s,t). The shadow map memory may reside internal or external to the shadow processing unit. In the later case, the shadow processing unit has a fast access connection (e.g., an interleaved connection) to the shadow processing unit.

In step 425, shadow processing unit compares the depth values of the neighborhood to the depth value $D_P$ to determine corresponding binary result values (indicating comparison pass or fail).

In step 430, the shadow processing unit filters the binary result values to determine a shadow fraction for the point P.

In step 435, the shadow processing unit transfers the shadow fraction to the computational unit.

The computational unit and shadow processing unit may be implemented on separate integrated circuits.

In one embodiment, a special-purpose chip may be used to perform shadow filtering. This chip has fast access to a previously computed shadow map, for example, by the use of embedded DRAM (i.e., dynamic random access memory) within the chip or a fast connection to a set of RAM chips.

Graphics rendering hardware may send a request for a shadow filtering operation. The request may include the (x,y,z) position of a point where shadowing is to be determined. The filter chip will have been previously been loaded with a transformation matrix that enables it to convert the supplied position into a (u,v) position within its preloaded shadow depth image. The filter chip additionally computes the distance from the given (x,y,z) point to the light source associated with the shadow depth map. The filter chip then retrieves a neighborhood of nearby samples from its associated RAM, and performs a distance comparison for each sample. The results of the distance comparison may be thought of as forming a rectangular array of "0" and "1" values, which are then weighted according to a set of filter parameters, and summed to produce a final result. This final result is passed back to the graphics rendering hardware. The comparisons and weightings may be performed in parallel.

By tightly coupling the shadow depth map storage with the filtering hardware, the needed bandwidth between the main graphics rendering hardware and the shadow hardware is substantially reduced, since a single (x,y,z) triple is passed in and a single shadow fraction value is returned. The retrieval of a neighborhood of samples may take advantage of higher on-chip bandwidth, or the use of a dedicated connection with optimal interleaving. The application of filter weights may be performed in parallel.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A graphical processing system comprising:
    a computational unit;
    a processing unit coupled to the computational unit through a communication bus;
    wherein the computational unit is configured to transfer coordinates $C_1$ of a point P with respect to a first space to the processing unit;
    wherein, in response to receiving the coordinates $C_1$, the processing unit is configured to: (a) transform the coordinates $C_1$ to determine map coordinates s and t and a depth value $D_p$ for the point P, (b) access a neighborhood of depth values from a memory using the map coordinates s and t, (c) compare the depth value $D_p$ to the depth values of said neighborhood to generate a vector of binary results of the comparisons, and (d) transfer the vector to the computational unit through the communication bus;
    wherein, in response to receiving the vector, the computational unit is configured to (e) filter the binary results of the comparisons to determine a shadow fraction; and
    wherein the communication bus is configured with minimum transfer bandwidth sufficient for the rate of transfer of the coordinates $C_1$ and the vector.

2. The graphical processing system of claim 1, wherein the first space is a virtual world space.

3. The graphical processing system of claim 1, wherein the first space is a screen space.

4. The graphical processing system of claim 1, wherein the computational unit is configured to modify a color associated with said point using the shadow fraction.

5. The graphical processing system of claim 1, wherein the processing unit and computational unit are configured to perform (a), (b), (c), (d), and (e) for successive points on the first object and successive objects.

6. The graphical processing system of claim 1, wherein the computational unit is implemented on a first integrated circuit and the processing unit is implemented on a second integrated circuit.

7. The graphical processing system of claim 6, wherein the memory for storing the depth values is embedded on the second integrated circuit.

8. The graphical processing system of claim 6, wherein the memory is implemented in one or more third integrated circuits, wherein the processing unit is coupled to the memory through a fast access connection.

9. The graphical processing system of claim 1, wherein the memory is implemented by a plurality of integrated circuits external to the processing unit, wherein the processing unit couples to the plurality of integrated circuits through fast access connections which provide said neighborhood of depth values to the processing unit in an interleaved fashion.

10. A method comprising:
    performing a first rendering pass in a computational unit from the perspective of a first light source to generate a depth buffer map for the first light source, wherein each depth value in the depth buffer map is based on a distance from the first light source to a first occluding intersection with an object along a ray emanating from the first light source;
    storing the depth buffer map in a memory;
    performing a second rendering pass in the computational unit from the perspective of a user viewpoint for a first object by;
    outputting a position of at least a first point on the first object from the computational unit to a processing unit via a communication bus;
    (a) the processing unit performing a transform on the position to determine depth buffer map coordinates s and t and a depth value $D_p$ for the position, wherein $D_p$ is based on the distance from the first light source to the position along a ray emanating from the first light source;
    (b) the processing unit generating a vector of binary results by comparing the depth value $D_p$ to each of a subset of depth values read from the memory, wherein the subset of depth values is from a neighborhood of depth values corresponding to the map coordinates s and t;
    (c) the processing unit outputting the vector to the computational unit via the communication bus; and
    (d) the computational unit computing a shadow fraction by filtering the binary results of said comparing, wherein the shadow fraction indicates darkness of a shadow cast by occluding objects relative to the first light source.

11. The method of claim 10, wherein the processing unit and computational unit are separate integrated circuits.

12. The method of claim 11, wherein the memory is embedded as part of the processing unit's integrated circuit.

13. The method of claim 10, further comprising modulating a light intensity value with the fraction, wherein the modulated light intensity is useable to determine a pixel of a displayable image.

14. The method of claim 10, wherein the position is a camera space position.

15. The method of claim 10, wherein the position is a screen space position.

16. The method of claim 10, wherein the transform is user programmable.

17. The method of claim 10, wherein (a), (b), (c), and (d) are performed for successive points on the first object and subsequent objects.

18. The method of claim 10, wherein the connection between the computational unit and the processing unit has a minimum transfer bandwidth configured for the transfer of the position data and the vector.

19. The method of claim 10, wherein said comparing the depth value $D_p$ to each of a subset of depth values incorporates a bias constant to prevent nearby points to P on the first object from generating any erroneous binary results for the nearby points.

20. The method of claim 19, wherein said bias constant is programmable.

* * * * *